No. 844,553. PATENTED FEB. 19, 1907.
S. J. WEBB.
METHOD OF COMPRESSING BALES.
APPLICATION FILED JAN. 22, 1900.

2 SHEETS—SHEET 1.

Witnesses
Inventor
Samuel J. Webb
Attorneys

No. 844,553. PATENTED FEB. 19, 1907.
S. J. WEBB.
METHOD OF COMPRESSING BALES.
APPLICATION FILED JAN. 22, 1900.

2 SHEETS—SHEET 2.

Witnesses
Inventor
Samuel J. Webb
Attorneys

UNITED STATES PATENT OFFICE.

SAMUEL J. WEBB, OF MINDEN, LOUISIANA.

METHOD OF COMPRESSING BALES.

No. 844,553.  Specification of Letters Patent.  Patented Feb. 19, 1907.

Application filed January 22, 1900. Serial No. 2,323.

*To all whom it may concern:*

Be it known that I, SAMUEL J. WEBB, a citizen of the United States, residing at Minden, in the parish of Webster and State of Louisiana, have invented certain new and useful Improvements in Method of Compressing Bales, of which the following is a specification.

My invention relates to a new and improved method of compressing bales of cotton and other material; and it has for its object to provide an improved method whereby the bales may be quickly compressed and the material thereof condensed to a high density and the bale confined and tied while under pressure and in a highly-condensed condition; and to these ends my invention consists in the various steps and combinations of steps constituting a new mode of operation for accomplishing the results desired in substantially the manner hereinafter more particularly set forth.

Figure 1:
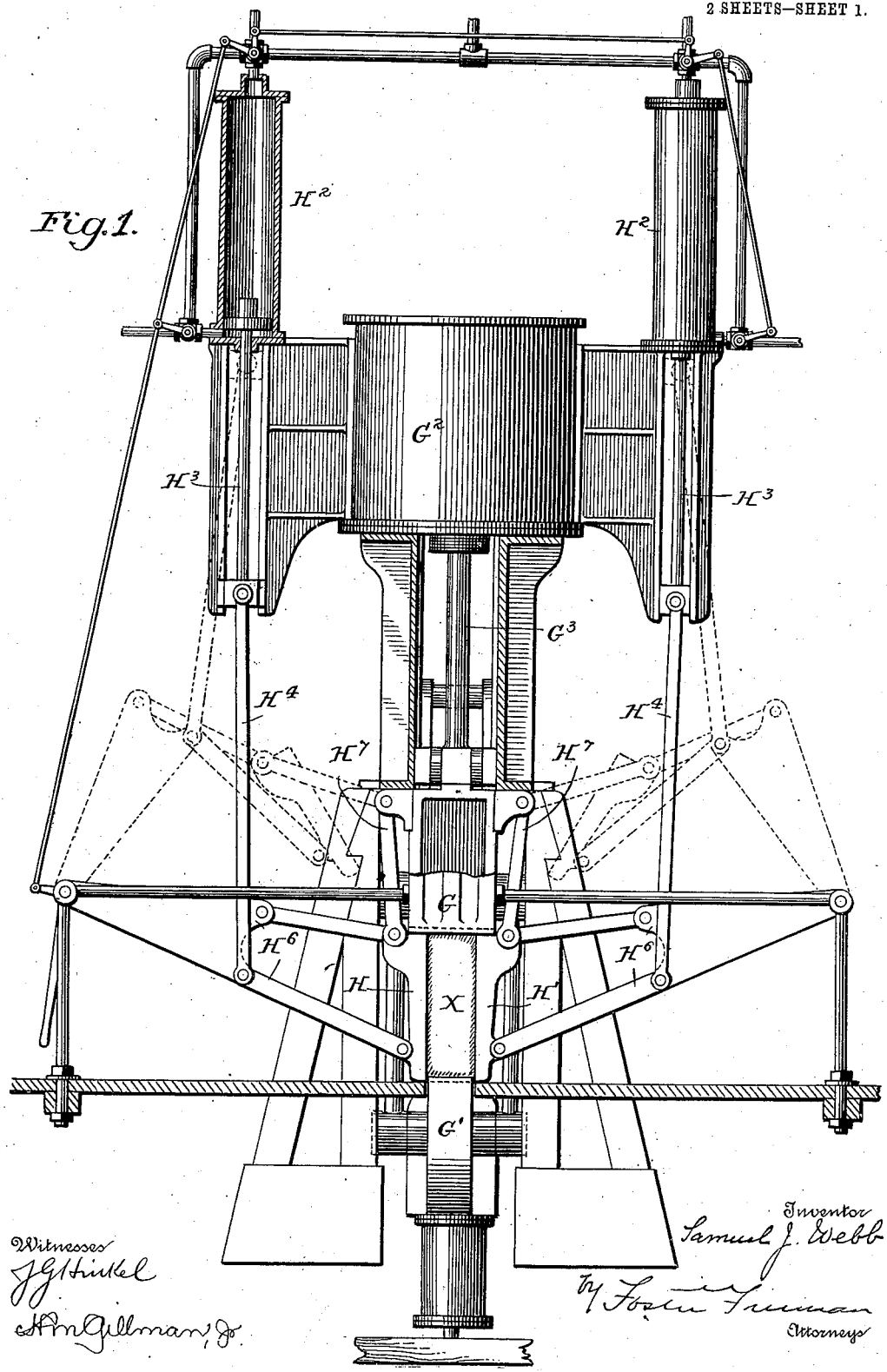
Figure 2:
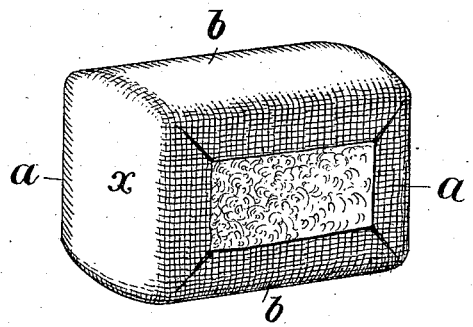
Figure 3:
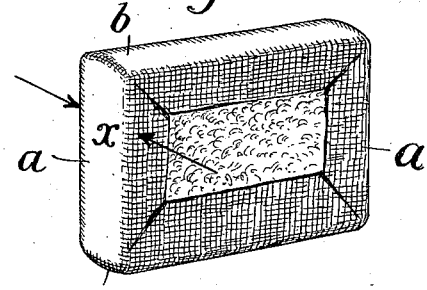
Figure 4:
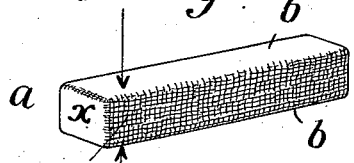
Figure 5:
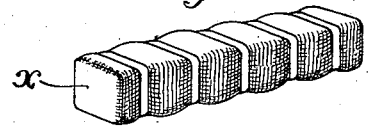

In the accompanying drawings, wherein I have illustrated in a general way means whereby my improved method may be carried out, Figure 1 of the drawings is a sectional view showing enough of an apparatus to enable its general principles to be understood whereby the method can be carried out. Fig. 2 illustrates a bale before being compressed. Fig. 3 shows the bale compressed in one direction. Fig. 4 shows the bale after receiving the compression in the other direction, and Fig. 5 illustrates the completed bale.

Of course it will be understood that the particular means shown form no part of my present invention and are only illustrated and described with sufficient particularity to indicate in a general way how my improved method may be practically utilized in the art.

In the ordinary handling of cotton, as is well known, it is common to form or arrange the cotton in bales in the field or on the plantation, and the cotton in the form of bales is usually subjected to more or less pressure, and it is often pressed so that the density of the bale is in the neighborhood of ten pounds to the cubic foot, more or less, and these are known as "field" or "plantation" bales. It is also common to take these field or plantation bales and subject them to greater pressure in a hydraulic, steam, or other compress, in which the density of the bale is greatly increased and which produces what is known as a "compressed" bale ready for shipment.

To illustrate in a general way, in ordinary practice it is usual for the bales to contain about five hundred pounds of cotton, and as it is pressed on the plantation the general dimensions of the bale may be given as thirty by forty by sixty inches, these varying more or less according to circumstances, and the density of these bales depending upon the character of the plantation-press. In ordinary practice these plantation-bales are subjected to a compress compressing the bale in one direction and compressing it over the whole surface at a single time, and the dimensions of the bale are reduced so that they may be said to be substantially thirty inches in width by from fifteen to twenty inches in thickness by sixty inches long, and this compression of the bale is in the direction of the pressure of the farm or plantation press, or, in other words, in the direction of the top and bottom of the bale. In the ordinary practice the length and width of the compressed bale remain substantially the same as the plantation-bale, but the thickness is largely reduced and the density of the mass may vary from twenty-five to thirty pounds per cubic foot. In order to accomplish this reduction in thickness and increased density when the bale is compressed over its entire surface, it is necessary to subject the bale to enormous pressure, amounting to two thousand tons, more or less.

In the compresses ordinarily used, as above intimated there are limits beyond which it has been found impracticable to condense the bale, and one of the main objects of my improvement is to provide a new method of compressing the bale whereby a greater densitty of the mass may be obtained, the density being increased from thirty to fifty per cent. over the best attainable results in the ordinary method using reciprocating compresses, and compressing the whole surface at once.

My invention consists in a method of operation whereby these results may be obtained in a satisfactory manner, and in order to accomplish this by my method I compress the plantation or other bale in two directions— that is, in the direction of its breadth or width against the edges of the layers thereof and in the direction of its thickness perpendicular to the plane of the layers—all at one operation without changing the relative position of the bale—that is, without turning it from one side to the other—and as a continuous operation. To do this, my improved method consists in compressing a bale in one direction, retaining or holding it under such pressure, then compressing the bale in another direction substantially at right angles to the direction of the first pressure, and banding and tying the bale while under pressure.

In the construction indicated in the drawings apparatus is illustrated in which, generally stated, there is a fixed bed G and a movable platen G′, a steam or other cylinder G², having a piston-rod G³, with connections between the same and the movable platen whereby the latter can be raised to compress the bale in a vertical direction. There are also shown side platens H H′, with cylinders H², having pistons and piston-rods H³ and connecting-rods H⁴, engaging levers H⁵, connected to the side platens by arms H⁶, and the platens are connected to some stationary portion of the compress or frame by the links H⁷, and the arrangement of parts is such that the side platens when not in operation are in the positions substantially as indicated in dotted lines, and when in operation they are moved to the positions indicated in full lines, and the arrangement of parts is such that after the side platens are brought down between the stationary bed and platen they are moved toward each other in practically a right line, compressing the bale X in a direction at right angles to the direction of pressure between the stationary bed and platen G and G′. Furthermore, after the bale is thus compressed in one direction the side platens are held in position so as to retain or hold the bale while it is being compressed between the bed and platen in a direction at right angles to the first pressure, and the side platens are so formed that the bale may be banded and tied in its compressed condition.

It will be seen that the bale once placed upon the movable platen is subjected to pressure in two directions without change of position or manipulation and after being compressed in one direction is retained and compressed in another direction at right angles to the first and banded.

The details of this construction need not be set forth with more particularity, as they are shown and described in my application Serial No. 2,321, filed January 22, 1900.

The above general description and illustration are sufficient to show that my improved method is not limited to any particular construction of apparatus and that its various steps may be performed with the aid of different structures. It is also manifest that the form of the bale is changed while being compressed in the first direction and that its surfaces at right angles to the direction of this first compression and to which the second or final compression is applied are reduced in area, so that by following my improved method not only can a bale be compressed rapidly, but that an increased density of the bale may be obtained with an expenditure of a given amount of power over that obtained in the ordinary method of compression, as in the final compression the power of the press is exerted over a smaller area of surface owing to the reduced or narrowed surfaces of the bale. Moreover, the operations of compressing the bale in two directions at substantially right angles to each other are practically continuous operations or follow each other without manipulation of the bale or moving it from one position to another or without turning the bale from one side to the other.

For the purpose of illustrating one operation Fig. 2 shows the plantation-bale, and if the pressure is first applied to the sides $a\ a$ the bale will be reduced to the form shown in Fig. 3, and pressure is then applied upon the sides $b\ b$ to reduce the bale, as shown in Fig. 4, and after banding the bale will be substantially as illustrated in Fig. 5. It will be understood, however, in the first place pressure may be applied first to the sides $b\ b$ and then to the sides $a\ a$ with like results, or it may first be applied to the end faces $x\ x$ and then to the sides $b\ b$.

Having thus particularly described my improved method or mode of operation and pointed out means whereby it may be carried out so that those skilled in the art can make and use the invention, without limiting myself to the precise details what I claim is—

1. The method substantially as herein set forth of compressing bales of cotton, which consists in compressing the bale against the edges of the layers thereof to change the form of the bale and make it narrower, retaining the bale against expansion at right angles to the direction of such pressure and in its narrowed form, and compressing the bale while thus retained in a direction perpendicular to the layers and on its narrowed sides without changing or manipulating the bale from its compressed position.

2. The method substantially as herein set forth of compressing bales of cotton, which consists in compressing the bale in one direction against the edges of the layers thereof and reducing the area of the surfaces to which the final pressure is applied, retaining the bale against expansion in the direction of such compression, compressing the bale finally by applying pressure perpendicular to the plane of the layers to reduced surfaces of the bale without changing the position of the bale and banding the bale in the direction of both compressions.

3. The method substantially as herein set forth of compressing bales of cotton or other material, which consists in first changing the form of the bale by pressure against the edges of the layers to make it narrower, and then compressing the bale by applying pressure to the narrowed surface of the bale.

4. The method substantially as herein set forth of compressing bales of cotton or other material, which consists in changing the form of the bale by pressure against the edges of the layers to make it narrower, confining it in such narrowed form, and then compressing the bale by applying pressure to the narrowed surface of the bale.

5. The method substantially as herein set forth of compressing bales of cotton or other material, which consists in reducing the area of the surface of the bale by pressure against the edges of the layers making it narrower, confining it against lateral expansion, and then compressing the bale by applying pressure to the reduced surface without turning or changing the position of the bale.

6. The method substantially as herein set forth of compressing bales of cotton or other material, which consists in applying pressure to the sides of the bale and against the edges of the layers, confining the bale against expansion in the direction of such pressure, compressing the bale while it is thus confined in a direction at right angles to the first pressure without turning or shifting the bale, and banding and tying the bale while under pressure.

7. The method substantially as herein set forth of compressing bales of cotton or other material, which consists in applying pressure to the bale in a direction against the edges of the layers, confining the bale against expansion in the direction of such pressure without turning or shifting the bale, compressing the bale at right angles to the first pressure, while it is thus confined, and banding and tying the bale in the direction of both pressures.

8. The method substantially as herein set forth of compressing bales of cotton or other material, which consists in compressing the bale in from the sides in a direction against the edges of the layers to make it narrower and then compressing it while confined in the direction of the first pressure without turning or shifting the position of the bale.

9. The method substantially as herein set forth of compressing bales of cotton or other material, which consists in pressing the bale on one or more sides to reduce the area of another side to which pressure is applied to compress the bale without turning or changing the position of the bale, and banding it in the direction of both pressures.

In testimony whereof I have signed my name to this specification in the presence of two subscribing witnesses.

SAMUEL J. WEBB.

Witnesses:
F. L. FREEMAN,
W. CLARENCE DUVALL.